June 28, 1960 G. O. CONNER 2,942,500
SLIP HEAD DRILL BUSHING
Filed Dec. 12, 1958 2 Sheets-Sheet 2
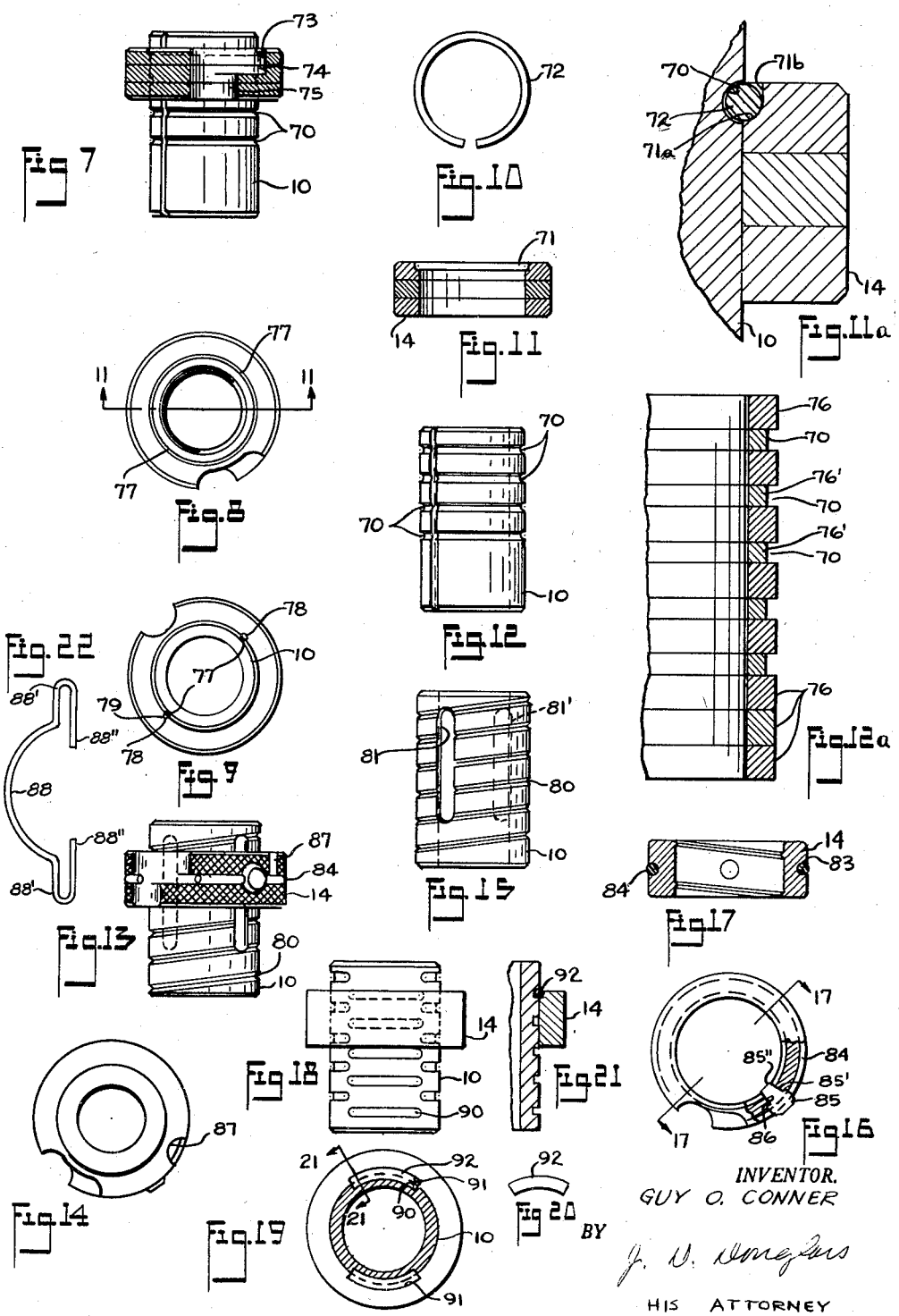
INVENTOR.
GUY O. CONNER
BY
HIS ATTORNEY

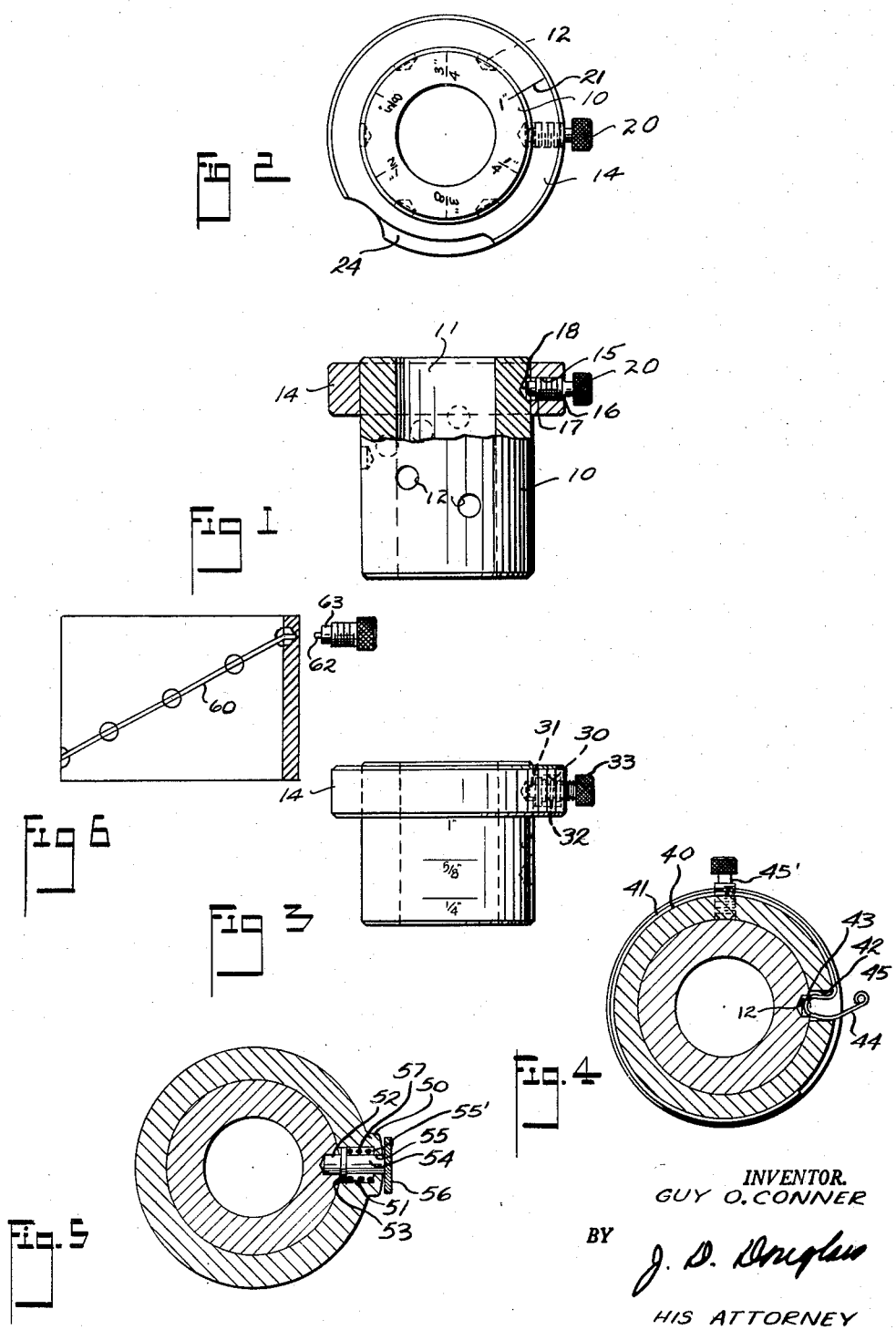

United States Patent Office 2,942,500
Patented June 28, 1960

2,942,500
SLIP HEAD DRILL BUSHING

Guy O. Conner, 1118 Mount Vernon Blvd., Cleveland Heights 12, Ohio

Filed Dec. 12, 1958, Ser. No. 780,166

40 Claims. (Cl. 77—62)

This invention relates to tool guiding means, and more particularly to an improved tool guiding bushing and is a continuation-in-part of my application for Drill Bushing Serial No. 586,598, filed May 22, 1956, now abandoned.

As is well known to those versed in the art, jigs and fixtures are preferably provided with replaceable guiding means, for accurate guiding of the tool which may be a drill, reamer or similar device, to predetermined positions on the work, known as drill guiding bushings.

As stated in the 14th edition of "Machinery Handbook," published by The Industrial Press, at page 1438, "Renewable wearing bushings to guide the tool are for use in liners which in turn are installed in the jig. They are used where the bushing will wear out or become obsolete before the jig or where several bushings are to be interchanged in one hole. Renewable wearing bushings are divided into two classes, 'fixed' and 'slip.' Fixed renewable bushings are installed in the liner with the intention of leaving them in place until worn out. Slip renewable bushings are interchangeable in a given size of liner and, to facilitate removal, they are usually made with a knurled head."

These tool guiding bushings usually comprise a cylindrical body having a drill guiding bore therein, the diameter of which depends upon the size of drill to be used, and a head which contacts with the upper portion of the liner bushing.

It is also common to use these bushings without the liner bushing and wherein the bushing is inserted directly into the bore in the jig. In this instance, the head of the bushing usually contacts with the surface of the jig surrounding the bore.

The more common of these "head" type bushings are (a) head press fit, (b) fixed renewable and (c) slip renewable. In each of the above bushings the head, which is usually at the end of the hollow stem, is of larger diameter than the stem for obvious reasons and is well known to those versed in the art.

These devices are used in great quantities by the industry, and the dealer handling them must have an enormous stock pile in order to supply the demands for the different sizes required by the trade. In connection with different sizes, it will be appreciated that this is determined by the bore diameters necessary to guide the wide variety of drill sizes as well as by the different lengths of drill bushings required by the different thicknesses of the jig parts. Therefore, whenever it is possible to provide a drill bushing having an adjustable feature, the stock pile necessary to supply the demands may be greatly reduced. The present invention enables this stock pile to be greatly reduced by virtue of the fact that the need for different lengths of bushings can be greatly reduced.

Furthermore, by the present invention the cost may be reduced because the parts comprising the article may be made separately and subsequently assembled. Certain of the parts may be reused when the other parts become worn. The actual manufacture of the parts of the new bushing enable a saving of 20 to 25% of material and the parts themselves are less expensive to make compared with the currently available bushings.

Briefly, my invention contemplates the provision of a drill guiding body of cylindrical formation having a separate adjustable head or flange which may be locked to the body in predetermined longitudinal positions upon the body to thus provide a bushing wherein one bushing can be used to provide bushings of different lengths and thus replace a stock of several bushings, and wherein one head may be used with several bodies having different diameter drill guiding bores.

Still other advantages of the invention will become apparent by the following description of some embodiments thereof which are illustrated in the accompanying drawings.

In the drawings:

Figure 1 is a view partly in section and partly in elevation of a bushing constructed according to my invention;

Figure 2 is a top plan view thereof;

Figure 3 is a view of a modification thereof, with certain otherwise hidden parts shown by dashed lines;

Figure 4 is a transverse section, taken through the head and body of a bushing illustrating another embodiment of the invention;

Figure 5 is a similar view of another embodiment of the invention;

Figure 6 is a developed view of another embodiment;

Figure 7 is a side view of another embodiment thereof;

Figure 8 is a top plan view of the bushing of Figure 7;

Figure 9 is a bottom plan view thereof;

Figure 10 is a plan view of a lock ring used in Figure 7;

Figure 11 is a section through the head removed from the body, taken on the line 11—11 of Figure 8;

Figure 11a is an enlarged fragmentary section of the device shown in Fig. 11;

Figure 12 is a side view of the body with the head removed;

Figure 12a is a fragmentary vertical section of a stem similar to that shown in Fig. 12 but of a different composite construction;

Figure 13 is a side view of another embodiment of the invention;

Figure 14 is a top plan view thereof;

Figure 15 is a side view of the body with the head removed;

Figure 16 is a plan view of the head removed from the body with certain parts broken away and shown in section;

Figure 17 is a view of the head taken from the line 17—17 of Figure 16;

Figure 18 is a side view of another embodiment of my invention;

Figure 19 is a view thereof, taken on the line 19—19 of Fig. 18;

Figure 20 is a plan view of a lock element;

Figure 21 is a section taken on the line 21—21 of Figure 19; and

Figure 22 is a plan view of another type of locking ring useful in conjunction with the device of Figures 13–17.

Referring to the drawings, throughout which like parts have been designated by like reference characters, and more particularly to Fig. 1, the bushing of my invention there illustrated comprises a cylindrical body 10 having a drill guiding bore 11 therethrough. The body 10 has a plurality of recesses 12 disposed in its surface. In the preferred form, the recesses are spaced longitudinally along the body and are displaced from each other peripherally around the body, thus being disposed in a helical line; they may be in staggered formation however. The recesses may take various forms, one of the simplest forms being provided by simply drilling into the body at the spaced points. The head flange is in the form of a ring 14 having an inner diameter such that it may slide on the body. It is provided with a threaded bore 15 extending radially through the flange and in which a screw, comprising a threaded stem 16, is threadingly engaged. The inner end of the stem is provided with a projection 17 which, when the screw is threaded through the flange, seats in the slanted bottom 18 of the recesses 12, to thus enable accurately positioning the flange upon the body. A knurled head 20 is provided on the screw for hand adjusting the same; it may also be provided with a hollow recess in the end, as is well known in the art, for engagement by a tool for tightening or loosening means, should it be desired.

As can be visualized from the drawings, when the screw is loosened the flange may be rotated and slid longitudinally on the body until the screw is opposite to any one of the recesses 12. When the screw is screwed inwardly to engage the recess, the head flange is then accurately positioned on the body to provide a body extending beyond the flange of a definite predetermined length. In the embodiment shown in Fig. 1, six such recesses are shown, thus enabling a bushing having an adjustable head to provide stem lengths from 1″ in increments down to one-fourth inch. If desired, as best shown in Fig. 2, the head flange may be provided with an index line 21 which may be aligned with any one of the index lines on the body indicated as 1″, ¾″ etc. to determine the exact length of the stem which projects beyond the head.

Also, as shown in Fig. 2, the usual locking grooves 24 are provided in the manner well known in the art for slip renewable bushings.

In the device shown in Fig. 3, the flange is provided with a pocket 30 in which there is disposed a headed pin 31. Between the head of the pin 31 and the end of the pocket is a helical spring 32 which holds the pin pressed inwardly toward the body of the bushing. The screw 33 is threaded through the outer wall of the bushing and extends through the center of the spring in a position to engage the headed pin. It will be understood that in the loosened condition, the pin is merely held inwardly by the spring pressure and this enables the flange to be rotated to its various positions on the stem, the recesses and the headed pin acting in the manner of a ball detent. After being positioned on the stem, the screw 33 may be tightened to securely push the pin home and lock the parts in position. It will be appreciated that in this instance, the recesses should be relatively shallow in order that the head may be turned, when the screw 33 is loose, to cause the pin 31 to be cammed out of the recesses.

In Figure 4 I have shown another embodiment, this being a section taken through a medial point on the head, wherein the head is provided with a circumferential groove 40 with an opening 42 which extends completely through the head. One end of the ring is provided with an inwardly projecting portion 43 which extends through the opening 42 and is adapted to engage in the recess 12. The spring is also provided with an outwardly extending portion 44 provided with an eye 45 which enables the spring ring to be grasped and pulled outwardly out of engagement with the detent. In this instance, I preferably provide a set screw 45′ which extends through a threaded opening in the head and may be screwed inwardly to engage the stem of the bushing which thus securely locks it in place.

In Figure 5 I have shown the head provided with a boss 50 in which a pocket 51 opens to the interior of the ring. The locking means comprises a stem 52 of the same conformation as the recesses and preferably of a size to provide a close sliding fit therewith. Spaced from the end of the stem is a flange 53 after which the stem continues outwardly at 54 through the opening 55 in the boss 50 and is provided with a head 56 for manual engagement. A helical spring 57 is disposed in the pocket with one end bearing against the flange 55′ on the boss and the other end engaging the flange 53 on the stem. The stem is thus spring pressed inwardly into locking position and may be moved outwardly by grasping the head 56 and pulling it against the pressures of the spring 57.

Figure 6 is a developed view illustrating the side wall of a bushing wherein the wall is provided with a longitudinally extending helical groove 60 which intersects a plurality of spaced recesses on the side. In this instance, the adjusting screw has a reduced end part 62 which is intended to always ride in the groove and adjacent thereof a larger body 63 which, when screwed inward engages in any one of the recesses. This assures that when the head is moved on the body it can easily be stopped at any of the points and the stop screw will be aligned with the particular recesses.

In Figure 7 I have illustrated another embodiment of the invention wherein the body 10 is provided with a plurality of circumferential grooves 70 which are disposed in vertically spaced relation along the stem at ¼ inch intervals. These grooves are preferably of semicircular cross section but would function equally well if they were of square, V-shaped or other cross section. The head 14 is provided with a seat or groove 71 having a semi-circular bottom portion 71a and a cylindrical top portion 71b. A spring C ring 72, of circular cross section is provided, and when inserted in the matching grooves 70 and 71 serves to lock the head against upward movement on the stem. Preferably the inner diameter of the head is such that a fairly tight fit is provided between the head and the stem, such that the head will not move too easily on the stem and such that it can be moved upon the application of pressure thereto.

In operation, if it should be determined that a ¼″ bushing is desired, the head is first moved on the stem to a position below the lowermost of the grooves 70. The ring 72 is then slid down on the stem from above until it seats in that groove and the head is moved back up until the groove 71 surrounds the ring. In this position further upward movement of the head is prevented because the bottom portion 71a engages the underside of the ring 72 and the ring is held in the groove by the side wall 71b of the head groove. Thus, the length of the bushing may be adjusted to provide a bushing of any desired length, in this instance in ¼ inch increments up to 1 inch.

It will be appreciated that stems of various lengths may be provided and that in this instance with a bushing having four grooves one bushing may be used to replace four bushings of different lengths. If the stem is longer it may be provided with more grooves and will replace as many more bushings as there are grooves.

Another feature of this particular embodiment resides in the construction of the head itself. In this instance, the head is formed from three or more laminations. These laminations may be plain rings which are secured to each other in stacked relation and soldered, brazed, welded or cemented together. The above construction is particularly desirable when a slip renewable bushing or a fixed renewable bushing is desired, since the rings can be stamped out of sheet metal stock and the necessary notches 73, 74 and 75 provided in the periphery at the same time to provide the desired type of conformation on the head for the above recited bushings. The above is recited in greater detail in my copending application Serial No. 523,742, filed July 22, 1955, the main difference being that in that application the body as well as the head is comprised of the laminations and in this case the head only is laminated. It is also contemplated, however, that the stem could also be made of laminations as described in that application and that in such instance the grooves 70 could be made by providing laminations of smaller diameter sandwiched between laminations of larger diameter. This is more clearly shown in Fig. 12a which is a fragmentary sectional view through a stem formed according to the above concept. In this view, discs 76 provide the body along with the smaller discs 76' which are sandwiched therebetween to provide the grooves 70. It will be appreciated that the grooves could be made at ⅛ inch intervals to thus provide stem lengths varying by ⅛ inch.

Means is also contemplated for preventing any possibility of the stem accidentally turning with respect to the head, which might accidentally occur should the flutes of the drill become loaded with some material during a drilling operation. To this end the body of the stem is provided with one or more longitudinally extending V shaped grooves 77 in the surface of the stem. If two grooves are used they are preferably diametrically opposite to each other. The head may then be staked at 78, opposite to the grooves 77 to cause a projection on the head which extends into and conforms to the walls of the groove. Thus, the wall acts as a key which extends into the groove and presents a smooth surface for sliding along the groove but prevents the head from turning on the stem.

In Figures 13 to 17 inclusive, I have shown another embodiment of my invention which is a modification of the device shown in Fig. 6. Briefly, it comprises a spiral groove on the stem which cooperates with a spiral land on the head and means to locate the head in certain predetermined positions. As best shown in Fig. 15, the surface of the stem is provided with a helical groove 80 having a pitch of ¼ inch for each 360°. The groove may be formed in any desired cross section, a simple formation being V shaped. It may extend the full length of the bushing or terminate spaced from one end. Intersecting the convolutions of the groove are two longitudinally extending grooves 81 and 81'. These grooves may be provided by a milling operation and preferably have steep side walls defining the edge. The depth may vary, and they may be shallow. The head 14 is provided with a circumferentially extending land 82 of the same pitch as the groove 80 and is designed to be threaded onto the stem and adjusted longitudinally thereon by turning the head. At its mid portion the head is provided with a circumferential groove 83 in which a spring ring 84 is disposed. The spring ring carries a lock pin which includes a body 85 having a transverse bore through which the ring 84 extends and which body is provided with a tapered side wall 85' that is seated in a tapered bore 86 in the ring and has a stem 85" which extends through the bore into the interior of the ring. The spring holds the pin spring pressed against its seat and the end 85" of the pin, when aligned with one of the grooves 81 or 81' extends into one of the grooves and prevents the head from turning. The head is provided with a notch 87 in its periphery which extends downward and intersects the groove 83. This is such that a pointed instrument may be inserted in the notch and below the ring 84 so that the ring may be levered outward to move the stem 85" out of the groove 81 or 81'.

It is apparent that with this adjustment the head may be adjusted to any position on the stem and that it may be locked thereto in ⅛ inch increments. Thus, a wide variety of different length bushings may be provided with one assembly.

The number of grooves 81—81' may be increased so that the head may be stopped after different amounts of revolution to provide an even greater range of adjustment. Thus, if four grooves 81—81' were provided it could be stopped every 90° and provide adjustments at ¹⁄₁₆ inch intervals.

In Figure 22 I have illustrated another type of locking member. In this instance the head may be provided with two diametrically opposite holes 86, which may be straight holes through the ring. The locking member includes a semi-circular body 88 at the ends of which are provided outwardly bent parts 88' and from which there are inwardly extending projections 88".

The body of the ring seats in the groove 83 and the projecting ends 88" extend through the holes 86 and into the grooves 81—81". Obviously the width of the grooves 81—81" depends upon the size of the projections 88". The bights 88' of the member then project beyond the edges of the grooves in a position to receive a sharp instrument for moving the ends 88" out of contact with the grooves. If one of the ends 88" is made short enough so that it does not extend into the groove, the member will still be held in place but only one part 88' would be needed, therefore one of the bights 88' could be eliminated.

In Figures 18 to 21, I have shown another embodiment of my invention which is similar to that shown in Fig. 7, but wherein the head may be adjusted on the stem in smaller increments than that of Fig. 17. In this instance, the body is provided with a plurality of shorter channels or recesses 90 which extend in a circumferential direction and may be formed by milling the surfaces. These grooves may also extend in rows, the grooves of adjacent rows being intermediate those of the next row. The head 14 is likewise provided with a pair of diametrically opposite recesses 91, which should be of the same length as the recesses 90 and has the same cross sectional and positional location as the groove 71 of Fig. 11.

The device operates in the same manner as the device of Figs. 7 to 12a except that instead of a ring, a pair of arcuate segments 92 are provided for effecting the locking. In this instance, the head is moved to a point just below the place where it is to be locked. The segments 92 are inserted in the recesses or pockets 90. Then the head is moved upward so that the segments are in interlocking engagement between the head and stem. The head is thus locked against further upward movement and since the ends of the segments abut the ends of the pockets in the ring and stem, the ring cannot turn on the stem. Because of the staggered relation of the pockets on the stem, the head may be adjusted in ⅛ inch increments on the stem by simply moving the head along the stem and lining up the pockets on the head with the desired pockets on the stem.

It will thus be seen that the bushings of my invention is considerably more economical to manufacture than those of the prior art because the body may be made of a tubing material with a minimum of machining operations, and that there is no loss of the material which is normally present when the head is made integral with the body due to the material removed from the body to leave the enlarged head. Furthermore, the body may be made of different material than the head, thus enabling the head to be made of a cheaper material. Likewise, the head may be cut from a tubular metal with a minimum number of machining operations, including that of threading the opening to receive the locking means.

In addition either the head or body may be made by the laminated construction previously mentioned.

It is also apparent that all of the heads may be used after the original stem has become worn out since there is substantially no wear to the head. Furthermore, one stem can be used and a slip renewable head, a fixed renewable head or a press fit head provided to thus further reduce the required stock pile. This in addition to the fact that one stem or body may be used and from the one as many as eight different length bushings may be provided when lengths from ⅛ to 1 inch are desired. Thus a savings in seven bushings is realized.

It will also be apparent that in the device of Figure 1 two or more concentric series of detents could be used and two or more of the locking screws.

It will be apparent that due to the fact that the bushings without the heads may also be used as headless press fit bushings the stock necessarily carried is still further reduced.

Having thus described my invention, I am aware that numerous and extensive departures may be made therefrom without departing from the spirit of the invention as defined in the appended claims.

I claim:

1. A tool guiding bushing comprising a cylindrical body of substantially the same diameter throughout its length having a tool guiding bore therein, a separate head flange for said body adjustably disposed thereon for positioning said head in different operative positions on said body.

2. A device as described in claim 1, wherein the head flange is constructed of superimposed rings secured to each other.

3. A device as described in claim 2, wherein the rings are formed to provide notches which combine to provide a recess for the reception of locking means.

4. A tool guiding bushing comprising a cylindrical body having a tool guiding bore therein, a head flange slidably disposed on said body and movable from one end to the other and arranged to be held in different fixed operating positions on the body.

5. A tool guiding bushing comprising a cylindrical body of substantially the same diameter throughout its length having a tool guiding bore therein, a separate head slidably disposed on the body and locking means cooperating with the head and body for providing locking engagement therebetween for positioning said head in different fixed operating positions on the body.

6. A device as described in claim 5, wherein said body is provided with index lines arranged for registry with the bottom of the head to indicate the length of the body beyond the head.

7. A device as described in claim 6, wherein the top of the body and head are provided with index lines to determine the proper angle of adjustment on the head relative to the body for registering said cooperating locking means.

8. A tool guiding means comprising a body having a tool guiding bore, a head for said body movably disposed thereon for movement along the body, means for locking said head at predetermined positions along said body, said body being formed with at least one inwardly extending relieved portion and means on said head for locking engagement in said relieved portion.

9. A tool guiding means comprising a body having a tool guiding bore, a head for said body movably disposed thereon for movement along the body, means for locking said head at predetermined positions along said body, said body being formed with a plurality of recesses and at least one recess on said head arranged to be aligned with the recesses on the body and means disposed in said aligned recesses for locking the head to the body.

10. A device as described in claim 9, wherein the recesses extend circumferentially of the body and head.

11. A device as described in claim 10, wherein the locking means is an arcuate member.

12. A device as described in claim 9, wherein the recesses are disposed in longitudinal rows vertically of the body.

13. A device as described in claim 11, wherein the recesses in each row are spaced vertically from the recesses in the adjacent row.

14. A tool guiding means comprising a body having a tool guiding bore, a head for said body movably disposed thereon for movement along the body, said body being formed with a plurality of circumferentially extending depressions disposed in longitudinally spaced relation, said head being formed with a depression arranged to be selectively aligned with any one of the depressions on the body and retainer means for interlocking engagement in the depressions of the head and body for locking said head to the body at predetermined positions along the body.

15. A device as described in claim 14, wherein said depressions are grooves.

16. A device as described in claim 14, wherein said retainer means is a C ring.

17. A device as described in claim 14, wherein the depressions in the body are in the form of grooves and the depression in the head extends circumferentially of the head.

18. A device as described in claim 9, wherein the locking means is an arcuate member and the head has a semicircular bottom wall forming a seat and an upper wall which is formed to permit passage of the body around the ring.

19. A device as described in claim 14, wherein the body is provided with a longitudinally extending groove and the head has a projection extending into the groove to prevent turning of the head on the body.

20. A tool guiding bushing comprising a body having a tool guiding bore therein, said body having a plurality of recesses formed therein, a head in slidable engagement with said body and locking means on said head for engagement in said recesses.

21. A tool guiding bushing comprising a cylindrical body having a tool guiding bore therein, the exterior of said body being formed with a plurality of inwardly extending recesses spaced longitudinally along the body, a head flange for slidable movement along said body on the exterior thereof and locking means carried by said head and engageable in said recesses for holding said head at predetermined positions on said body.

22. A tool guiding bushing comprising a cylindrical body having a tool guiding bore therein, said body being formed with a plurality of recesses at longitudinally spaced portions along the periphery of the body and the adjacent recesses being peripherally spaced from each other, a head flange disposed on said body in slidable engagement therewith along said body and rotatable on the body, locking means carried by said head for selective engagement with any one of said recesses for locking said flange to said body at different positions lengthwise of the body.

23. A device as described in claim 22, wherein said locking means comprises a threaded member extending through said flange and having a portion for engagement in any one of said recesses.

24. A device as described in claim 22, wherein said locking means comprises a spring carried by said head and having a part engageable in any selected one of said recesses.

25. A device as described in claim 22, wherein said head is formed with a pocket and a spring pressed catch is disposed in said pocket and a thread screw member extends from the periphery of said head into said pocket into engagement with said catch for locking said catch in any one of said recesses.

26. A device as described in claim 22, wherein said locking means comprising a spring ring and said head is formed with a circumferential groove for receiving the ring and an opening is provided from the bottom of the groove to the interior of the head and the ring has a projection on the end of the ring extending through the opening into one of the recesses in the body for holding the head at predetermined points on the body, said spring having a projection extending beyond the confines of the recess.

27. A device as described in claim 22, wherein the head is provided with index lines and the body is provided with marked index lines to provide visual indication of the position of the head on the body.

28. A tool guiding bushing including a cylindrical body of substantially the same diameter throughout its length having a tool guiding bore therein, a separate head slidably disposed on the body, said body being formed with a groove and means on said head for locking engagement with the groove for operatively positioning the head in different fixed positions longitudinally on the body.

29. A device as described in claim 28, wherein the body is provided with a helically extending groove in its periphery, and the head is provided with a helical land on its interior for threaded engagement in the groove.

30. A device as described in claim 29, wherein the body is provided with at least one longitudinally extending recess and means is provided extending from the head into the recess to lock the head in predetermined positions on the body.

31. A device as described in claim 29, wherein said lock means comprises a spring pressed member carried by the head and extending into the body.

32. A device as described in claim 29, wherein the body is provided with a plurality of longitudinally extending recesses and locking means is provided for selective engagement in one or the other of said recesses.

33. A device as described in claim 29, wherein the head is provided with a peripheral groove and an opening is formed from the groove to the interior and lock means is disposed in the groove and extends through the ring into the longitudinal groove.

34. A device as described in claim 29, wherein said lock means is a resilient C ring and means is provided connected to the ring and extending through the head into the groove.

35. A device as described in claim 29, wherein the body is provided with at least one longitudinally extending recess intersecting the convolutions of said groove, and the head is provided with a circumferential seat for holding a spring lock ring and the spring lock ring has a locking element connected thereto and extending through the ring into said recess.

36. A device as described in claim 35, wherein the head has a notch extending from the top thereof into the spring seat for the reception of a tool to lift up the spring and unlock the lock element.

37. A device as described in claim 28, wherein the groove is helical.

38. A device as described in claim 28, wherein the groove slants upwardly around the body and has spaced recesses in its edges.

39. A device as described in claim 38, wherein the locking means comprises a screw, threaded through the head, and has an extension engaged in the groove and an enlargement for engagement in the recesses.

40. A device as described in claim 14, wherein the body is formed of a plurality of rings, some of said rings being of smaller diameter than the others to provide said depressions.

References Cited in the file of this patent

UNITED STATES PATENTS

| | | |
|---|---|---|
| 1,603,022 | Briney | Oct. 12, 1926 |
| 1,685,785 | Muth | Oct. 2, 1928 |